(12) United States Patent
Lee et al.

(10) Patent No.: US 9,965,513 B2
(45) Date of Patent: May 8, 2018

(54) SET-ORIENTATED VISIBILITY STATE RETRIEVAL SCHEME

(71) Applicants: Juchang Lee, Seoul (KR); Mihnea Andrei, Issy les Moulineaux (FR); Colin Florendo, Marlborough, MA (US); Ivan Schreter, Mannheim (DE); Anil Kumar Goel, Waterloo (CA)

(72) Inventors: Juchang Lee, Seoul (KR); Mihnea Andrei, Issy les Moulineaux (FR); Colin Florendo, Marlborough, MA (US); Ivan Schreter, Mannheim (DE); Anil Kumar Goel, Waterloo (CA)

(73) Assignee: SAP SE, Walldorf (DE)

( * ) Notice: Subject to any disclaimer, the term of this patent is extended or adjusted under 35 U.S.C. 154(b) by 312 days.

(21) Appl. No.: 14/553,226

(22) Filed: Nov. 25, 2014

(65) Prior Publication Data
US 2016/0147834 A1  May 26, 2016

(51) Int. Cl.
*G06F 17/30* (2006.01)

(52) U.S. Cl.
CPC .. *G06F 17/30463* (2013.01); *G06F 17/30339* (2013.01); *G06F 17/30345* (2013.01); *G06F 17/30353* (2013.01); *G06F 17/30548* (2013.01)

(58) Field of Classification Search
None
See application file for complete search history.

(56) References Cited

U.S. PATENT DOCUMENTS

| 5,230,073 | A  | * | 7/1993  | Gausmann | G06F 17/30359 |
| 5,323,444 | A  | * | 6/1994  | Ertz | H04M 3/51 |
|           |    |   |         |   | 379/245 |
| 9,268,807 | B2 | * | 2/2016  | Blanco | G06F 17/30315 |
| 9,607,033 | B2 | * | 3/2017  | Dantzig | G06F 17/30362 |
| 9,710,479 | B2 | * | 7/2017  | Benjamin-Deckert | G06F 17/30171 |
| 2003/0055805 | A1 | * | 3/2003 | Gardner | G06F 17/30356 |
| 2004/0205066 | A1 | * | 10/2004 | Bhattacharjee | G06F 17/30592 |
| 2005/0165829 | A1 | * | 7/2005 | Varasano | G06F 17/211 |
| 2008/0077591 | A1 | * | 3/2008 | Gupta | G06F 9/466 |
| 2008/0082496 | A1 | * | 4/2008 | Kalos | G06F 3/0619 |

(Continued)

OTHER PUBLICATIONS

European Search Report for Application No. 15003095.5 dated Dec. 17, 2015, 9 pages.

(Continued)

*Primary Examiner* — Bai D. Vu
(74) *Attorney, Agent, or Firm* — Sterne, Kessler, Goldstein & Fox P.L.L.C.

(57) ABSTRACT

Disclosed herein are system, method, and computer program product embodiments for determining row visibility states. An embodiment operates by initializing a result bitmap for rows based on visible row state values of row state bitmaps corresponding to the rows, wherein values of the result bitmap indicate whether the row are visible or not visible; determining one or more rows whose corresponding visible row state values indicate that the one or more rows are not visible; and determining whether to update the result bitmap to indicate that the one or more rows are visible based on one or more versioned row state values, wherein the one or more versioned row state values indicate whether the corresponding rows are not visible or possibly visible.

16 Claims, 4 Drawing Sheets

(56) References Cited

U.S. PATENT DOCUMENTS

| | | | |
|---|---|---|---|
| 2010/0281005 A1* | 11/2010 | Carlin | G06F 17/30312 707/696 |
| 2012/0079391 A1* | 3/2012 | Dantzig | G06F 17/30362 715/739 |
| 2014/0095547 A1* | 4/2014 | Guo | G06F 17/30073 707/792 |
| 2014/0289209 A1* | 9/2014 | Lee | G06F 17/30362 707/704 |
| 2014/0304246 A1* | 10/2014 | Helmich | G06F 9/546 707/704 |
| 2015/0120687 A1* | 4/2015 | Bhattacharjee | G06F 17/30362 707/704 |
| 2015/0363468 A1* | 12/2015 | Alvey | G06F 17/30315 707/769 |

OTHER PUBLICATIONS

R. Salinas-Monteagudo and F. Muñoz-Escoí, Almost Triggerless Writeset Extraction in Multiversioned Databases, Second International Conference on Dependability, 2009, 8 pages.

* cited by examiner

SET-ORIENTATED VISIBILITY STATE RETRIEVAL SCHEME

BACKGROUND

Visibility state retrieval (VSR) operations are used to decide whether one or more specified rows should be visible to a given query or not. In database systems whose transaction processing is based on multi-version concurrency control (MVCC) or snapshot isolation, a specified row's visibility to a given query is typically decided based on when the row was recently modified and when the query was started. Generally, the states of rows that need to be checked for a query are iterated one by one individually. However, for analytical queries which may need to access very large number of rows in a table or entire rows in a table, this row-oriented VSR operation incurs a high transactional cost because it is done one-by-one for each row.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for determining row visibility states.

Figure 1:
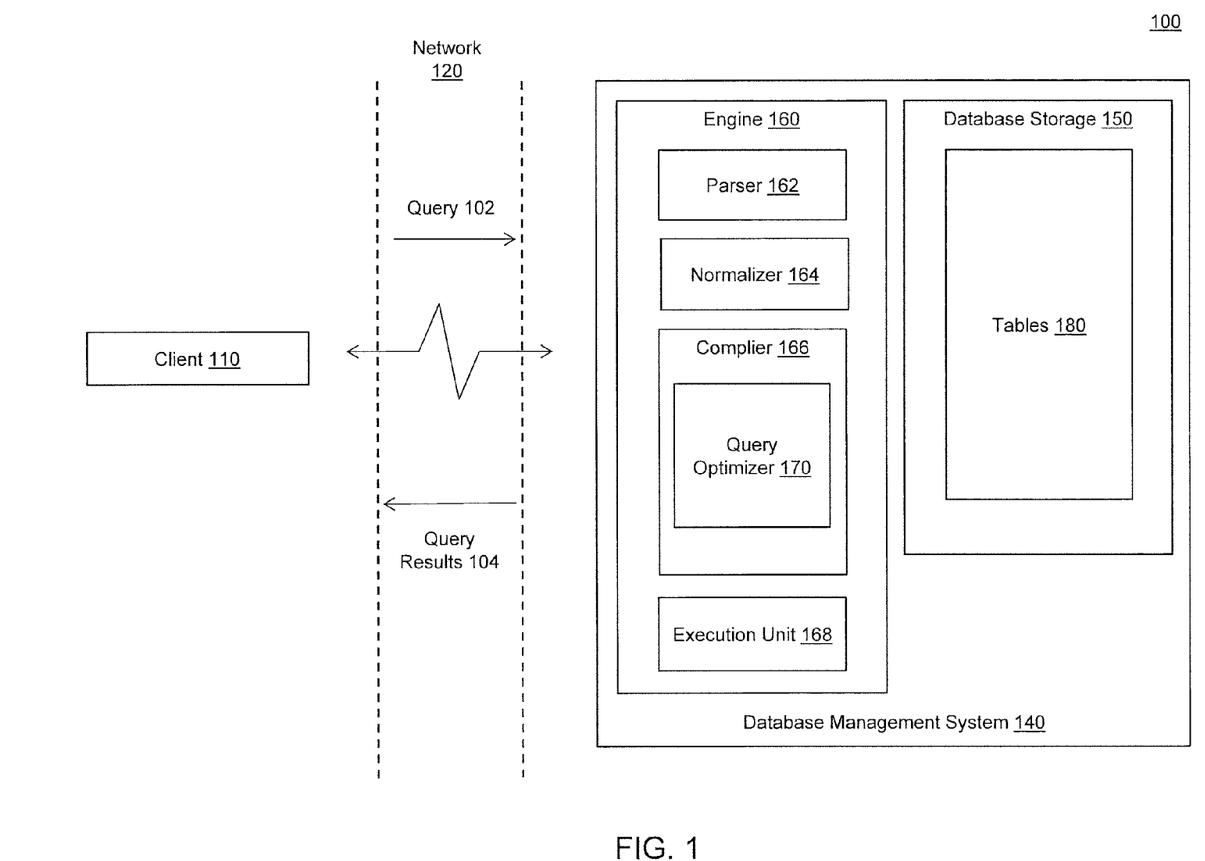
FIG. 1 is a block diagram of a database system, according to an example embodiment.

FIG. 1 is a block diagram of a database system 100 for determining row visibility states, according to an example embodiment. Database system 100 includes a database management system (DBMS) 140 and client 110 that communicates DBMS 140. DBMS 140 can be a system executing on a server and accessible to client 110 over a network, such as network 120, described below. Although client 110 is represented in FIG. 1 as a separate physical machine from DBMS 140, this is presented by way of example, and not limitation. In an additional embodiment, client 110 occupies the same physical system as DBMS 140. In a further embodiment, client 110 is a software application which requires access to DBMS 140. Client 110 can request access to DBMS 140. Additionally, both client 110 and DBMS 140 can execute within a computer system, such as an example computer system discussed in FIG. 4.

Client 110 and DBMS 140 can communicate over network 120. Network 120 can be any network or combination of networks that can carry data communications. Such a network 120 can include, but is not limited to, a local area network, metropolitan area network, and/or wide area network that include the Internet.

A relational database is a collection of data items organized as a set of formally-described tables from which data can be accessed or reassembled in many different ways without having to reorganize the database tables. A relational database employs a set of tables containing data fitted into predefined categories.

Each table itself comprises one or more rows or records (tuples). A database can contain many tables, each of which stores information. A table in a relational database can contain, for example, anywhere from a few rows to millions of rows. A row is divided into fields or columns; each field or column represents one particular attribute of the given row. A row corresponding to an employee record, for example, may include information about the employee's ID Number, Last Name and First Initial, Position, Date Hired, Social Security Number, and Salary. Each of these categories, in turn, represents a database field or column. In the foregoing employee table, for example, Position is one column, Date Hired is another, and so on. With this format, tables are easy for users (e.g., system administrators) to understand and use. Moreover, the flexibility of tables permits a user to define relationships between various items of data, as needed. Thus, a record can include several categories of information, for example, about an individual person, place, or thing. Each row in a table is uniquely identified by a record identifier or row identifier ("RID"), which can be used as a pointer to a given row.

In an embodiment, the rows and/or columns are stored in one or more of tables 180. Any combination of the rows and/or columns of tables 180 can be stored compressed or uncompressed in tables 180. That data in tables 180 can be compressed using row compression, page-dictionary compression, page-index compression, column compression, or any combination thereof. Compressed rows and/or columns of tables 180 can each be compressed with different compression types. The rows and/or columns of table 180 can be stored in memory.

DBMS 140 receives a query, such as query 102, from client 110. Query 102 is used to request, modify, append, or otherwise manipulate or access data in database storage 150. Query 102 is transmitted to DBMS 140 by client 110 using syntax which conforms to a query language. In a non-limiting embodiment, the query language is a Structured Query Language ("SQL"), but can be another query language, such as SQL Script (a scripting language for describing application specific calculations inside the database), a MultiDimensional eXpressions (MDX), WIPE (weakly structure information processing and exploration) for data graph processing and FOX (for planning applications), to give a few examples. DBMS 140 is able to interpret query 102 in accordance with the query language and, based on the interpretation, generate requests to database storage 150.

Query 102 can be generated by a user using client 110 or by an application executing on client 110. Upon receipt, DBMS 140 begins to process query 102. Once processed, the result of the processed query is transmitted to client 110 as query result 104.

In an embodiment, query 102 includes one or more sub-queries. A sub-query is a query included within another query. Any sub-query may comprise one or more sub-queries.

To process query 102, DBMS 140 includes engine 160, which includes a parser 162, a normalizer 164, a compiler 166, and an execution unit 168.

Parser 162 parses the received queries 102. In an embodiment, parser 162 converts query 102 into a binary tree data structure which represents the format of query 102. In other embodiments, other types of data structures are used.

When parsing is complete, parser 162 passes the parsed query to a normalizer 164. Normalizer 164 normalizes the parsed query. For example, normalizer 164 eliminates redundant SQL constructs from the parsed query. Normalizer 164 also performs error checking on the parsed query that confirms that the names of the tables in the parsed query conform to the names of tables 180. Normalizer 164 also confirms that relationships among tables 180, as described by the parsed query, are valid.

Once normalization is complete, normalizer 164 passes the normalized query to compiler 166. Compiler 166 compiles the normalized query into machine-readable format. The compilation process determines how query 102 is executed by DBMS 140. To ensure that query 102 is executed efficiently, compiler 166 uses a query optimizer 170 to generate a query plan for executing the query. Execution unit 168 receives the query plan and executes it to produce query results 104.

Query optimizer 170 analyzes the query and determines a query plan for executing the query. The query plan retrieves and manipulates information in the database storage 150 in accordance with the query semantics. This can include choosing the access method for each table accessed, choosing the order in which to perform a join operation on the tables, and choosing the join method to be used in each join operation. As there can be multiple strategies for executing a given query using combinations of these operations, query optimizer 170 generates and evaluates a number of strategies from which to select the best strategy to execute the query.

In an embodiment, query optimizer 170 generates multiple query plans. Once generated, query optimizer 170 selects a query plan from the multiple query plans to execute the query. The selected query plan may be a cost efficient plan, a query plan that uses the least amount of memory in DBMS 140, a query plan that executes the quickest, or any combination of the above, to give a few examples. In an embodiment, the selected query plan may be the query plan that invokes the least Input/Output accesses, which may be executed the fastest, particularly when the Input/Output accesses involve compression and decompression operations. For example, query optimizer 170 may generate a query that instructs execution unit 168 to execute a query in accordance with the method depicted in FIG. 3.

In an embodiment, when database management system 140 receives instructions that manipulate data stored within, these instructions may manipulate data in rows of a table, such as those in tables 180. For example, client 110 may issue instructions that include insert, update, or delete operations on one or more rows in tables 180. In an embodiment, one or more instructions may be referred to as transactions. These transactions are active transactions that temporarily manipulate data in database management system 140. Active transactions become permanent transactions when one or more instructions to commit the transaction is received. When a commit operation occurs, the data changes made to rows of table 180 in database management system 140 become permanent.

In an embodiment, when a transaction is an active transaction, multiple clients 110 can issue requests that manipulate data in the same row of a same table. For example, a request from each client 110 can spawn a database management system thread that performs transactions for a particular client 110 in parallel with other threads for other clients 106. Because multiple threads manipulate the same row in table 180, execution unit 168 determines the correct value for the row in table 180 after multiple threads complete manipulating the data in the row.

In an embodiment, after transactions are committed, the changes to the data in the one or more rows in table 180 become permanent. Namely, once transactions are committed, changes to the data from the committed transactions become visible to other threads in database management system 140. The changes to the data become visible or not visible depending on, for example, the snapshot timestamp (e.g. a query timestamp) and the MVCC timestamp associated with the row in table 180 that includes the changes. For example, rows with data that is inserted or updated in table 180 may be visible to multiple threads while rows with data that is deleted are not visible to multiple threads.

In an embodiment, to track transactions by multiple threads that change the visibility of data, a database management system 140 uses timestamp comparison. For example, the execution unit 168 can use timestamps and timestamp comparison to track the visibility status of each row that results from transactions by one or more threads. In one instance, if the same row was inserted and deleted by different threads, database management system 140 may compare the insert timestamp and deletion timestamp to determine the correct value and/or existence of a row.

Figure 2:
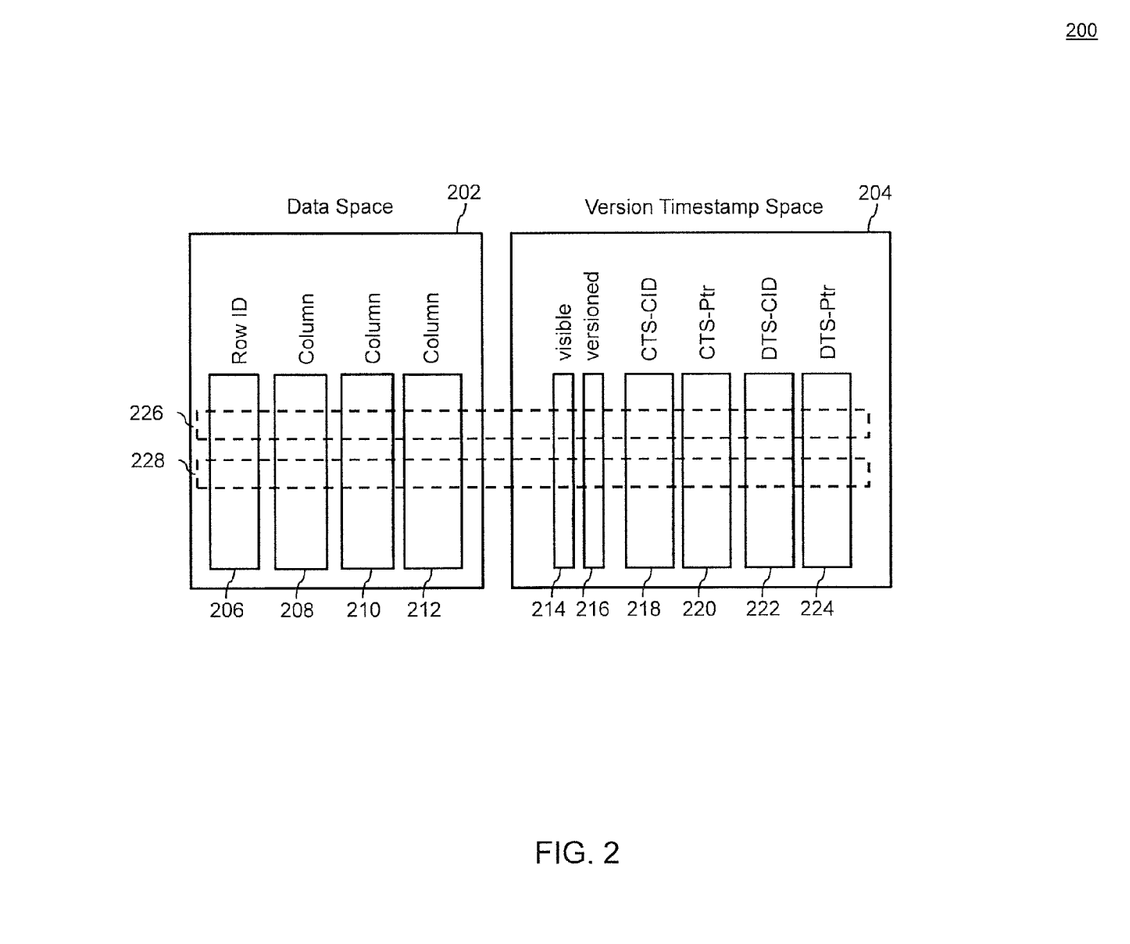
FIG. 2 is a block diagram of a MVCC structure, according to an example embodiment.

FIG. 2 is a block diagram of a MVCC structure 200, according to an example embodiment. MVCC structure 200 includes a data space segment 202, a version timestamp space segment 204, and one or more transaction control blocks (TCBs) (not shown). In an embodiment, MVCC structure 200 is maintained by execution unit 168 for providing MVCC. MVCC can be stored in database storage 150, such as in one or more of tables 180. Although data space segment 202 and version timestamp space segment 204 are depicted as separate structures, this is by example and not limitation, and embodiments support storing data space segment 202, version timestamp space segment 204, or any of the data represented by these segments separately or together in any combination.

Data space segment 202 can store the content of database management system 140, such as tables comprising a series of rows and columns. In an embodiment, the rows of tables in data space segment 202 include the following columns: row ID 206 and columns 208, 210, and 212. Although data space segment 202 is shown having four columns, embodiments support any number and configuration of columns and rows.

Version timestamp space segment 204 includes rows, corresponding to the same rows on data space segment 202, that store version information for database management system 140's data. In an embodiment, the rows on version timestamp space segment 204 include the following columns: visible 214, versioned 216, Create Timestamp (CTS) Commit Identifier (CID) 218, CTS Pointer to TCB (CTS-PtrTCB) 220, Destroy Timestamp (DTS) CID 222, and DTS Pointer to TCB (DTS-PtrTCB) 224.

In an embodiment, two types of version timestamps are maintained for each row for VRS operations. A CTS represents the commit timestamp of a transaction which had inserted the row. A DTS represents the commit timestamp of a transaction which had deleted the row. As in FIG. 2, those timestamps can be stored in a space separate from the data, e.g. version timestamp space segment 204.

FIG. 2. also depicts two example rows 226 and 228. Rows 226 and 228 are shown to illustrate the logical relationship between values in data space segment 202 and version timestamp space segment 204. However, embodiments support any number of rows.

In an embodiment, a row state bitmap represents the corresponding row's visibility state partially by using two bits for each row. The row state bitmap can be stored in visible 214 and versioned 216 columns, in which each column stores one of the two bits, respectively. Using the row state bitmap, each row can have at least three states, such as those example states described in Table 1. The row state bitmap may be referred to herein using a two-bit string in which the first bit represents the visible bit and the second bit represents the versioned bit.

TABLE 1

| Visible bit | Versioned bit | Visibility state |
| --- | --- | --- |
| 0 | 0 | Not visible to all existing queries |
| 0 | 1 | Possibly visible or not visible to existing queries |
| 1 | 0 | Visible to all existing queries |
| 1 | 1 | Visible to all existing queries |

For example, if the state is 00 or 10, the row's final visibility state can be determined without additional information. If the state is 01, it may be necessary to refer to other information, such as information gleaned from checking a row's corresponding CTS or DTS, to determine the visibility state of the row. The visibility state of the row may vary between queries.

In an embodiment, the one or more TCBs correspond to atomic database transactions. An atomic database transaction may be a group of one or more operations, such as read and write operations, that are committed together. A TCB maintains commit information for a transaction, which can be used by a reader process to determine what version of data should be returned in response to a read operation.

In an embodiment, execution engine 160 performs garbage collection, during which, for example, rows that have been permanently deleted and are no longer visible to any existing queries are removed from tables 180. For example, 00-state rows will be permanently deleted because they are not visible to any query. Garbage collection can also include revising the state of 01-state rows. For example, the CTS and DTS timestamps can be compared to the earliest existing query timestamp to determine whether the 01-state rows can be revised to 00-state or 10-state rows. Thus, 01-state rows may eventually converge to 00-state or 10-state as the queries which can potentially read those rows disappear.

Figure 3:
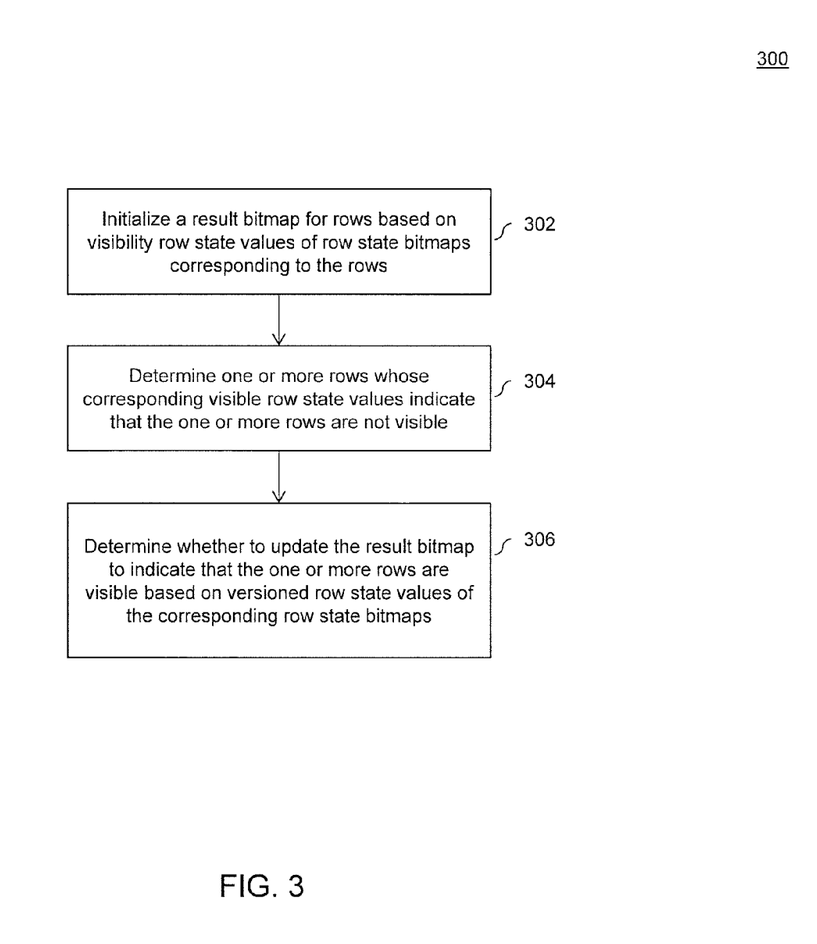
FIG. 3 is a flowchart illustrating a process for determining row visibility states, according to an example embodiment.

FIG. 3 is a flowchart for a method 300 for determining row visibility states, according to an embodiment. Method 300 can be performed by processing logic that can comprise hardware (e.g., circuitry, dedicated logic, programmable logic, microcode, etc.), software (e.g., instructions run on a processing device), or a combination thereof. For example, method 300 may be performed by execution unit 168 in FIG. 1.

In an embodiment, visible row state values are stored in a visible row state array, versioned row state values are stored in a versioned row state array, or any combination thereof. For example, the data structure of the row state bitmaps can be changed from an array of two-bit states into two arrays of one-bit states. As used herein, the term "visible row state array" refers to an array of visible bits of one or more row state bitmaps, and the term "versioned row state array" refers to refers to an array of versioned bits of one or more row state bitmaps. The visible row state array and versioned row state array be may stored separately from one another, e.g. as distinct data structures.

As an example, suppose there are five rows that have the following row state bitmaps: row 1: 10, row 2: 01, row 3: 00, row 4: 10, and row 5: 10. Instead of maintaining the row state bitmaps using a single array of {1, 0, 0, 1, 0, 0, 1, 0, 1, 0}, the row state bitmaps are stored in two arrays. The visible bits of the row state bitmaps are stored in the visible row state array {1, 0, 0, 1, 1}, and the versioned bits of the row state bitmaps are stored in the versioned row state array {0, 1, 0, 0, 0}.

At block 302, a result bitmap is initialized. In an embodiment, execution unit 168 initializes the result visibility bitmap. The result bitmap for rows can be initialized based on visible row state values of row state bitmaps corresponding to the row, a default value, (e.g. '0' or '1'), or any combination thereof. The values of the result bitmap can indicate whether the row at positions corresponding to locations in the bitmap or visible or not visible.

In an embodiment, the result bitmap is initialized by copying the values from the versioned row state array into the result bitmap. For example, execution unit 168 can copy the versioned row state array to the result bitmap.

At block 304, one or more rows whose corresponding visible row state values indicate that the one or more rows are not visible are determined. In an embodiment, execution unit 168 identifies the the one or more rows whose corresponding visible row state values indicate that the one or more rows are not visible. For example, each row that has corresponding '0' in the visible row state array can be identified as candidates for further processing. Further, each row that has a corresponding '1' in the visible row state can be identified as visible to all existing queries, and therefore, no additional processing may be needed to determine its visibility state.

At block 306, whether to update the result bitmap to indicate that the one or more rows are visible is determined. In an embodiment, execution unit 168 determines whether to update the result bitmap to indicate that any or all of the one or more rows are visible, despite having previously been identified as not visible. The determination can be based on the one or more versioned row state values of the corresponding row state bitmaps.

In an embodiment, for one or more rows that have been identified has having visible row state values indicating the row is not visible, the versioned row state values are checked to determine whether the row is not visible to all existing queries or possibly visible or not visible to the existing queries. For example, each row that has a corresponding '0' in the versioned row state can be identified as not visible to any existing query, and therefore, no additional processing is needed to determine its visibility state. For each row that has a corresponding '1' in the versioned row state, further processing can be formed to determine whether the row is visible or not.

In an embodiment, the further processing can include comparing the query time (as indicated, for example, by a query timestamp) to the CTS and/or DTS corresponding to the row. For example, if the query occurs after the DTS and CTS, then the row should be marked as not visible to the query. If the query occurs at or before the DTS and on or after the CTS, then the row should be marked as visible to the query. If the query occurs before CTS, then the row should be marked as not visible to the query. In an embodiment, CTS and DTS fields for a row are initialized to an extremely high value as to simulate an infinitely high value.

In an embodiment, the result bitmap is updated to indicate that the one or more rows that were not visible are visible based on the determining whether to update the result bitmap. For example, some of the rows that may have had a '0' in the result bitmap may have been subsequently determined to be visible. The values of these bits can be toggled to '1' to reflect the determination that the rows are visible to the current query. Thus, after processing the row state bitmap values, the result bitmap can indicate the correct visibility states of the rows with respect to a query of interest.

In an embodiment, database management system 140 receives query 102 over network 120. Execution unit 168 performs query 102 using one or more rows indicated to be visible by the result bitmap, but not those rows indicated to be not visible by the result bitmap. Database management system 140 sends query results 104 to client 110.

Using the set-oriented VSR scheme described above, the visibility of a set of rows can be checked using a single batch operation, instead of on a row-by-row basis. However, the set-oriented VSR embodiments can be combined with row-oriented VSR operations. Thus, if a query accesses a small number of rows, the query can utilize the row-oriented VSR operation. Otherwise, it can dynamically utilize the set-oriented VSR operation.

Some differences between the row-oriented VSR and the set-oriented VSR can be explained with the examples below, which is based on the five-row example from above.

The following table illustrates an example row-oriented VSR operations for the five rows.

TABLE 2

| Execution steps | State transition of the result bitmap representing visibility by a single bit for each row (1: visible, 0: not visible) |
| --- | --- |
| 1. Initialize the result bitmap with 0's | {0, 0, 0, 0, 0} |
| 2. Read two row state bits of row 1 and set its visibility result | {1, 0, 0, 0, 0) |
| 3. Read two row state bits of row 2, check its CTS/DTS (because it's {0, 1} state) and set its visibility result (assuming that row 2 is visible here to a given query) | {1, 1, 0, 0, 0} |
| 4. Read two row state bits of row 3 and set its visibility result | {1, 1, 0, 0, 0} |
| 5. Read two row state bits of row 4 and set its visibility result | {1, 1, 0, 1, 0} |
| 6. Read two row state bits of row 5 and set its visibility result | {1, 1, 0, 1, 1} |
| 7. Return the result bitmap | {1, 1, 0, 1, 1} |

The following table illustrates an example set-oriented VSR operations for the five rows.

TABLE 3

| Execution steps | State transition of the result bitmap representing visibility using a single bit for each row (1: visible, 0: not visible) |
| --- | --- |
| 1. Copy the visible row state array to the result bitmap | {1, 0, 0, 1, 1} |
| 2. Find row positions whose values are 0 in the first array. Rows 2 and 3 will be returned. | {1, 0, 0, 1, 1} |
| 3. Check the second row state bit of row 2 and its CTS/DTX and toggle the corresponding bit in the result bitmap | {1, 1, 0, 1, 1} |
| 4. Check the second row state bit of row 3 | {1, 1, 0, 1, 1} |
| 5. Return the result bitmap | {1, 1, 0, 0, 1} |

As shown above, in the example row-oriented VSR operations, the row state array is looked up using five separate calls. But, in the set-oriented VSR operation, the visible row state array can be read by a single operation, and then two more separate lookups to the versioned row state array follows.

Significant performance benefits arise from using set-oriented VSR scheme. The number of instructions used to determine VRS is reduced compared to the row-by-row VRS operations. This can result in using both less processing time and fewer memory operations.

The benefits can be attributed, in part, to at least the following two factors. First, since the visible row state array can be read by a single operation, there is a high probability that the hardware-level memory prefetching works more efficiently. For example, for a given array of {A, B, C}, reading {A, B, C} by a single call can be more efficient than reading them by three separate calls.

Second, in many practical cases, rows whose state is 10 are dominant. This is due in part because 00-state rows will be permanently deleted because they are not visible to any query, and 01-state rows will eventually converge to 00-state or 10-state as the queries which can potentially read those rows disappear. Thus, the overhead in the set-oriented VSR associated with reading the versioned row-state array separately can be drastically reduced in many practical cases.

Figure 4:
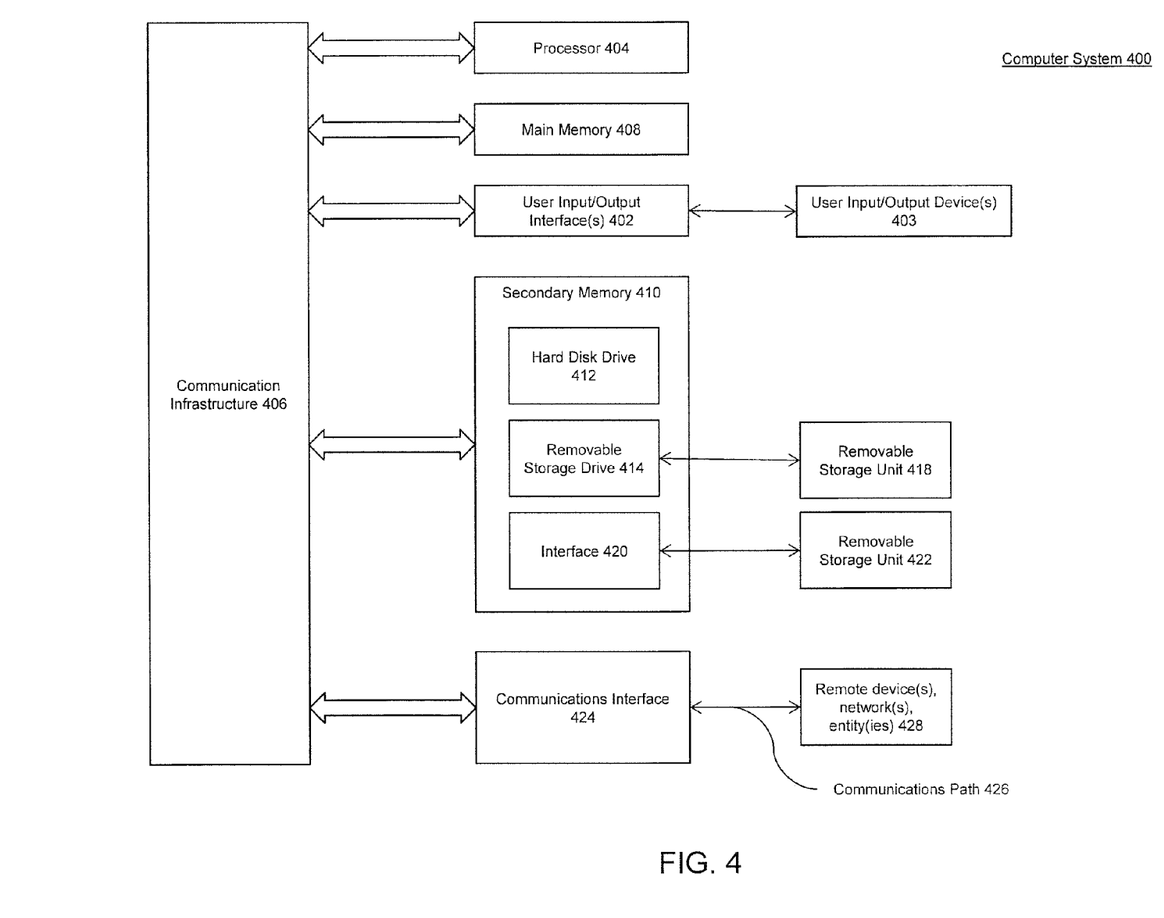
FIG. 4 is an example computer system useful for implementing various embodiments.

Various embodiments can be implemented, for example, using one or more well-known computer systems, such as computer system 400 shown in FIG. 4. Computer system 400 can be any well-known computer capable of performing the functions described herein.

Computer system 400 includes one or more processors (also called central processing units, or CPUs), such as a processor 404. Processor 404 is connected to a communication infrastructure or bus 406.

One or more processors 404 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 also includes user input/output device(s) 403, such as monitors, keyboards, pointing devices, etc., that communicate with communication infrastructure 406 through user input/output interface(s) 402.

Computer system 400 also includes a main or primary memory 408, such as random access memory (RAM). Main memory 408 may include one or more levels of cache. Main memory 408 has stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 reads from and/or writes to removable storage unit 418 in a well-known manner.

According to an exemplary embodiment, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426.

In an embodiment, a tangible apparatus or article of manufacture comprising a tangible computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 4. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer implemented method for determining row visibility states, comprising:

initializing, by at least one processor, a result bitmap corresponding to each row of a plurality of rows of data, wherein the result bitmap comprises both a first bit and a second bit that indicate whether the corresponding row is visible or not visible;

determining, based on the first bit of the result bitmap, a selection of one or more of the rows for which the visibility state is either indeterminate or invisible, wherein the first bits of the rows are stored in first array, and wherein the first bit values are read from the first array in a single operation;

identifying, based on the second bit of the result bitmap, a particular one of the selection of rows for which the visibility state is indeterminate and needs to be updated, wherein the second bits of the rows are stored in a second array; and updating the second bit of the particular row based on a timestamp comparison of either a commit timestamp or a destroy timestamp corresponding to the particular row to another timestamp.

2. The method of claim 1, wherein the updating comprises:

updating the result bitmap to indicate that one or more rows that were not visible are visible.

3. The method of claim 1, further comprising:

receiving a query; and performing the query using one or more rows indicated to be visible based on the first bit of the result bitmap.

4. The method of claim 1, wherein the first array is stored separately from the second array.

5. The method of claim 1, wherein the updating comprises:

comparing the commit timestamp or the destroy timestamp to a query timestamp; and determining, based on the comparing, whether the particular row is visible to one or more queries.

6. The method of claim 1, wherein the result bitmap, for the particular row whose visibility state needs to be updated, indicates that for one or more existing queries, the visibility state is neither visible nor hidden.

7. A system, comprising:
a memory; and
at least one processor coupled to the memory and configured to:
- initialize a result bitmap corresponding to each row of a plurality of rows of data, wherein the result bitmap comprises both a first bit and a second bit that indicate whether the corresponding row is visible or not visible;
- determine, based on the first bit of the result bitmap, a selection of one or more of the rows for which the visibility state is either indeterminate or invisible, wherein the first bits of the rows are stored in first array, and wherein the first bit values are read from the first array in a single operation;
- identify, based on the second bit of the result bitmap, a particular one of the selection of rows for which the visibility state is indeterminate and needs to be updated, wherein the second bits of the rows are stored in a second array; and
- update the second bit of the particular row based on a timestamp comparison of either a commit timestamp or a destroy timestamp corresponding to the particular row to another timestamp.

8. The system of claim 7, wherein the at least one processor to update is configured to:
update the result bitmap to indicate that one or more rows that were not visible are visible.

9. The system of claim 7, the at least one processor further configured to:
receive a query; and
perform the query using one or more rows indicated to be visible based on the first bit of the result bitmap.

10. The system of claim 7, wherein the first array is stored separately from the second array.

11. The system of claim 7, wherein to update the at least one processor is configured to:
compare the commit timestamp or the destroy timestamp to a query timestamp; and
determine, based on the comparison, whether the particular row is visible to one or more queries.

12. A tangible computer-readable device having instructions stored thereon that, when executed by at least one computing device, causes the at least one computing device to perform operations comprising:
- initializing a result bitmap for rows based on visible row state values of row state bitmaps corresponding to the rows, wherein values of the result bitmap indicate whether the row are visible or not visible;
- determining, based on the first bit of the result bitmap, a selection of one or more of the rows for which the visibility state is either indeterminate or invisible, wherein the first bits of the rows are stored in first array, and wherein the first bit values are read from the first array in a single operation;
- identifying, based on the second hit of the result bitmap, a particular one of the selection of rows for which the visibility state is indeterminate and needs to be updated, wherein the second bits of the rows are stored in a second array; and
- updating the second bit of the particular row based on a timestamp comparison of either a commit timestamp or a destroy timestamp corresponding to the particular row to another timestamp.

13. The computer-readable device of claim 12, wherein the updating comprises:
updating the result bitmap to indicate that one or more rows that were not visible are visible.

14. The computer-readable device of claim 12, the operations further comprising:
receiving a query; and
performing the query using one or more rows indicated to be visible based on the first bit of the result bitmap.

15. The computer-readable device of claim 12, wherein the first array is stored separately from the second array.

16. The computer-readable device of claim 12, the determining ether to update the result bitmap comprising:
comparing the commit timestamp or the destroy timestamp to a query timestamp; and
determining, based on the comparing, whether the particular row is visible to one or more queries.

* * * * *